N. B. POST.
CORN POPPING MACHINE.
APPLICATION FILED MAY 10, 1913.

1,109,247.

Patented Sept. 1, 1914.
4 SHEETS—SHEET 2.

Witnesses:
T. Colson,
H. T. Bull.

Inventor,
Nathaniel B. Post,
By Joshua H. Torres
his Attorney.

N. B. POST.
CORN POPPING MACHINE.
APPLICATION FILED MAY 10, 1913.
1,109,247.
Patented Sept. 1, 1914.
4 SHEETS—SHEET 3.
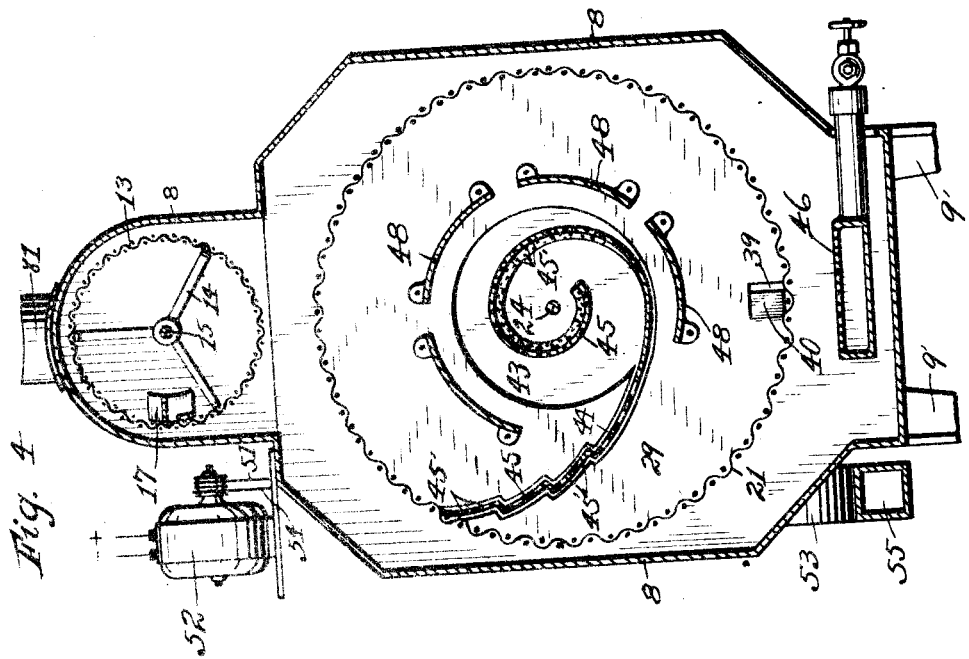
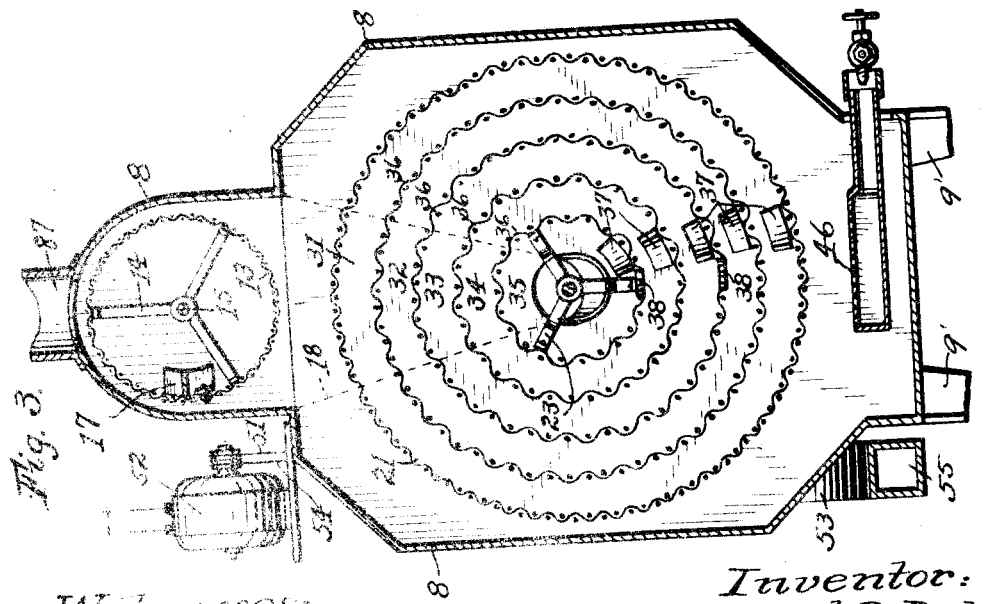
Witnesses:
Inventor:
Nathaniel B. Post,
By Joshua R. H. Horr
his Attorney.

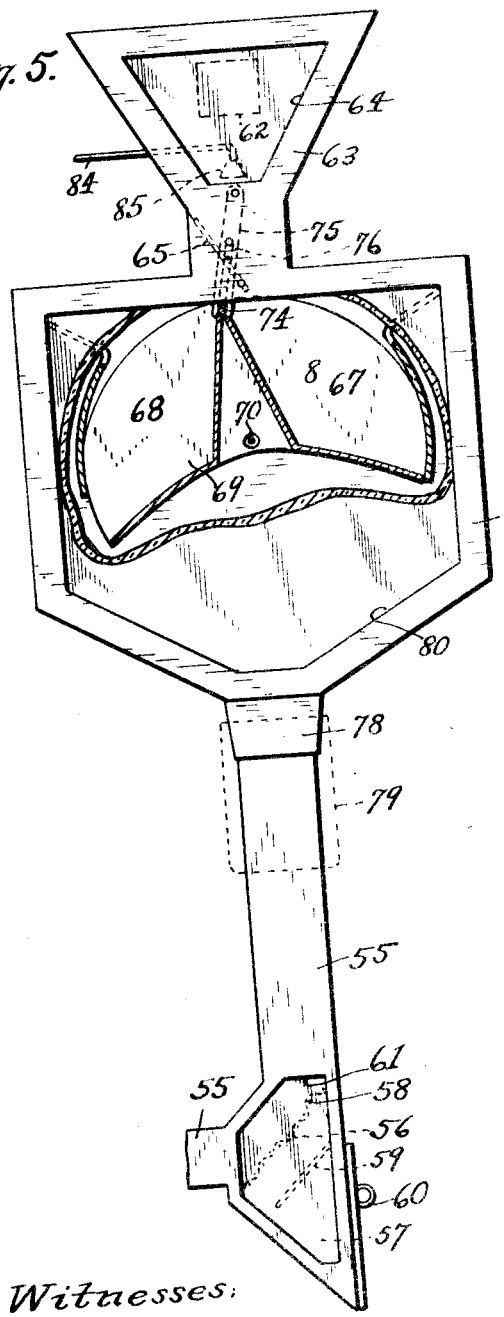
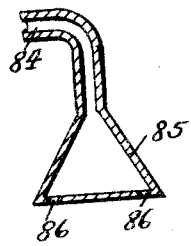
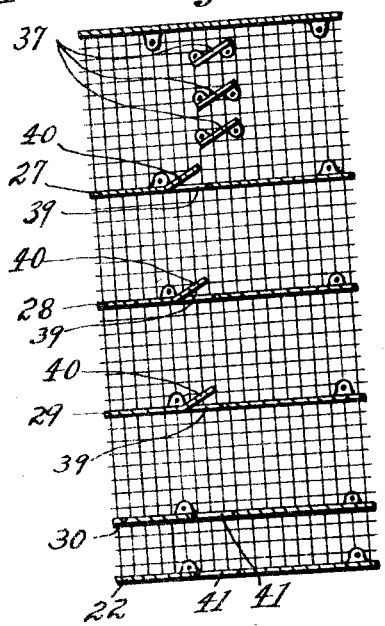

UNITED STATES PATENT OFFICE.

NATHANIEL B. POST, OF CHICAGO, ILLINOIS.

CORN-POPPING MACHINE.

1,109,247.   Specification of Letters Patent.   Patented Sept. 1, 1914.

Application filed May 10, 1913. Serial No. 766,750.

*To all whom it may concern:*

Be it known that I, NATHANIEL B. POST, a citizen of the United States, and a resident of the city of Chicago, county of Cook, and State of Illinois, have invented certain new and useful Improvements in Corn-Popping Machines, of which the following is a specification.

My invention relates to corn popping machines, and the object of this improvement is to provide a simple and effective machine for continuously popping corn and which separates the unpopped corn from the popped corn.

Other objects will appear hereinafter.

The invention consists in the combinations and arrangements of parts hereinafter described and claimed.

Figure 1:
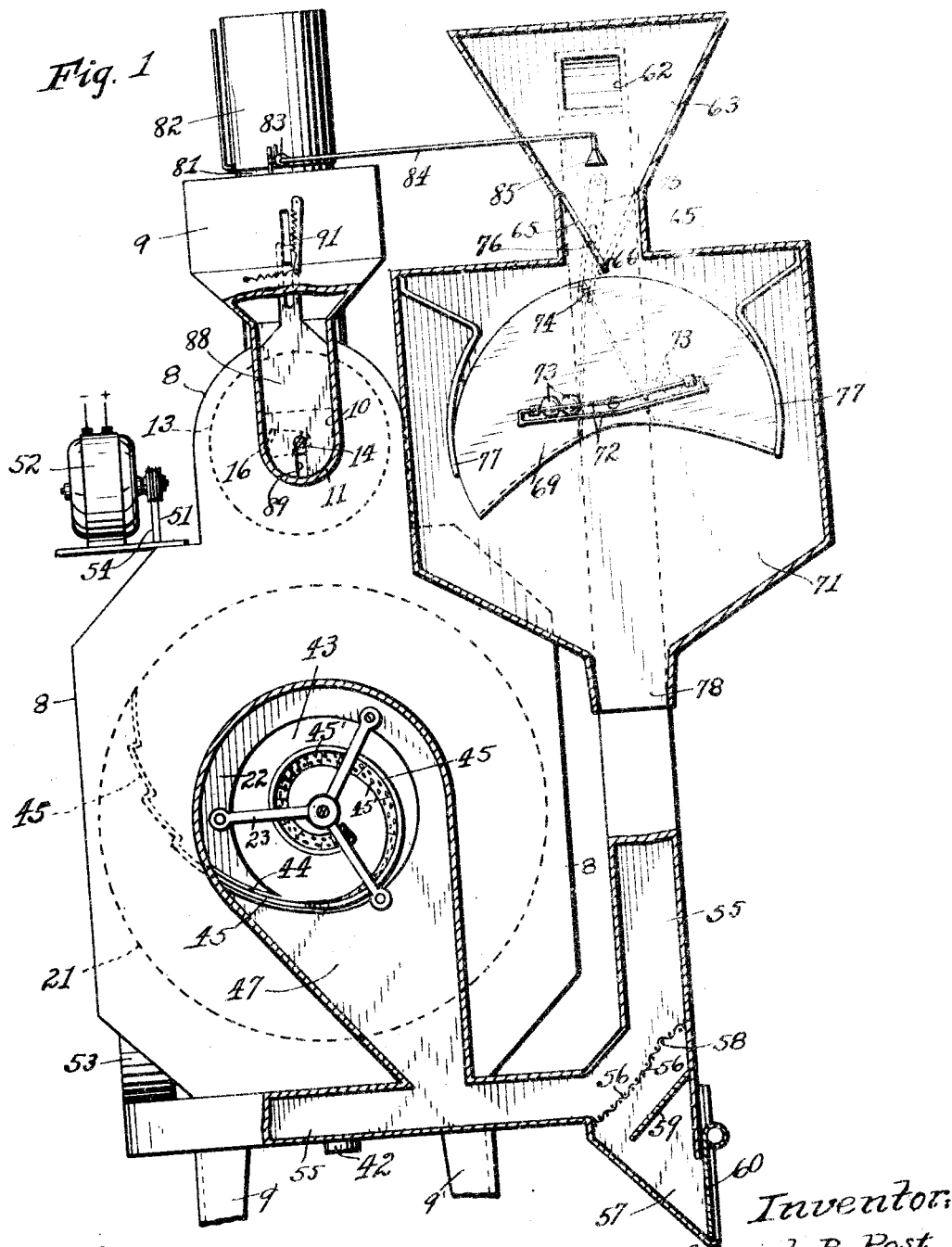
Figure 2:
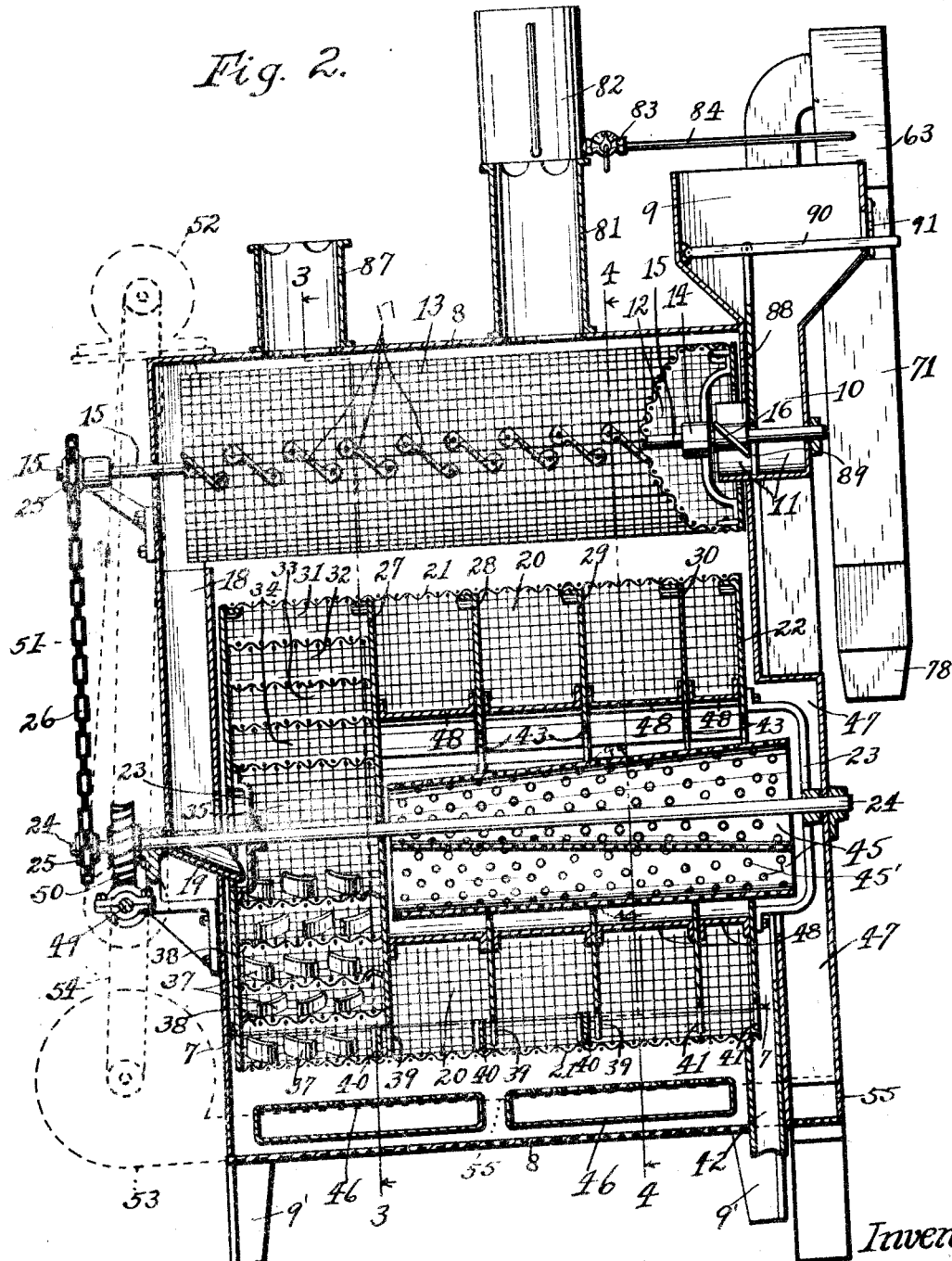

The invention will be best understood by reference to the accompanying drawings forming a part of this specification, and in which, Figure 1 is a front elevation with portions removed to expose underlying portions of a corn popping machine embodying my invention, Fig. 2 is a vertical longitudinal section of the same, Fig. 3 is a section taken on line 3—3 in Fig. 2, Fig. 4 is a section taken on line 4—4 in Fig. 2, Fig. 5 is a front view of a portion of the machine, Fig. 6 is an enlarged detail section of a flavor distributing nozzle employed in the construction, and Fig. 7 is a section taken on line 7—7 in Fig. 2.

The preferred form of construction as illustrated in the accompanying drawings comprises a housing 8 mounted on supporting legs 9'. On the upper front portion of housing 8 is a hopper 9 adapted to receive the raw corn to be popped. The hopper 9 is provided with a chute 10 leading downwardly and provided with a spout 11 leading through housing 8 into a rotative warming chamber 12. The circular wall 13 of the warming chamber 12 is provided with supporting spiders 14 mounted on a shaft 15 which extends through housing 8. Also, on the shaft 15 is secured a scraper 16 having an inclined blade and adapted to scrape the corn from the spout 11 into the chamber 12. The circular wall 13 of the chamber 12 is provided with a plurality of inclined plates 17 distributed throughout the length of the chamber 12 which are adapted to move the corn longitudinally of the chamber 12 as said warming chamber is revolved.

At the rear end of the machine is a chute 18 leading from the rear end of the warming chamber 12 downwardly into a spout 19. The spout 19 delivers the corn into the popping chamber 20. The popping chamber 20 is provided with a cylindrical wall 21 of perforated material such as wire fabric and solid end walls 22. The end walls 22 are provided with supporting spiders 23 which are mounted on a shaft 24 furnishing an axis for the popping chamber 20. The shaft 24 is connected to the shaft 15 by means of sprocket wheels 25 and sprocket chain 26 to move simultaneously therewith.

The popping chamber 20 is divided into smaller compartments by means of partitions 27, 28, 29 and 30. The compartment between one end wall 22 and partition 27 is further divided into a number of concentric compartments 31, 32, 33, 34 and 35 by means of partitions 36. Each of the compartments 31 to 35 inclusive, is provided with inclined plates 37 adapted to move the corn longitudinally in each of said compartments. The inclined plates 37 in one of said concentric compartments being oppositely disposed to those in the next adjacent compartment in order to pass the corn first in one direction to one end of the compartment between one end wall 22 and the partition 27, then after passing into the next outer concentric compartment to the opposite side thereof, as is clearly shown. The compartments 31 to 35 inclusive, are provided with communicating passages 38 which allow the corn after passing through one concentric compartment to pass outwardly into the next concentric compartment thence through this compartment to the next outer compartment until the corn has passed through the outermost compartment 31.

The partitions 27, 28 and 29 are provided with perforations 39 at the periphery at one side and provided with inclined plates 40 to facilitate passing the corn through said partitions as the chamber 20 is rotated. The partition 30 and the front end wall 22 are provided with perforations 41 but do not have an inclined plate to facilitate passing corn therethrough, as it is not desirable to force the corn through these partitions. By permitting the corn to take its own course through the latter part of the popping chamber 20 all of the grains which will pop are sure to be popped before passing through the perforation 41 in the wall 22 to reach the waste passage 42 which receives the unpopped corn and conveys it out of the machine.

Each of the partitions 28, 29 and 30 and the front end wall 22 is provided with a central perforation 43 in registration with each other and slits 44 also in registration with each other. Inserted in the slits 44 and extending into the perforations 43 is a substantially spirally curved plate 45. The plate 45 is preferably made of perforated material and disposed in such a manner as to pick up the corn as the chamber 20 is rotated and permit the unpopped corn to pass through the perforations 45' thereof and again fall on the tubular wall 21 of the chamber 20 to be further acted on by the heat from burners 46. The sheet 45 is offset substantially as indicated in Figs. 1 and 4 and the perforations 45' are provided in the portions of the sheet between said offset portions, as clearly indicated to present a greater inclined portion for the unpopped corn to facilitate its passing through said perforations 45' as will be readily understood. The perforations 45' in the portion of sheet 45 in perforations 43 are preferably smaller than the perforations 45' between said offset portions. Said burners 46 are of any preferred construction. The portion of the plate 45 extending into the perforations 43 is further curved conically with the curved portion extending through the wall 22, as clearly indicated in Figs. 1, 2 and 4 so that the corn on passing over plate 45 as the popping chamber 20 is rotated will automatically move toward the front end of the machine after it has passed to the portion of said sheet 45 extending into the perforations 43, in order to permit the corn to pass from the sheet 45 into the hopper 47.

Secured between the partitions 27, 28, 29, 30 and front end wall 22 are curved plates 48 adapted to prevent the direct heat from burners 46 from further acting on the corn after it has passed over sheet 45 to that portion thereof extending in the perforations 43. These plates 48 prevent overheating or burning the corn after it is popped.

The shaft 24 is connected to shaft 49 by means of a worm gear connection 50 and said shaft 49 is connected by means of an endless belt 51 to a motor 52 or other suitable source of power. A centrifugal fan 53, or other source of supplying air under pressure is also connected to the motor 52 by means of an endless belt 54.

The air circulating means 53 is connected to an air tube 55 which passes across the lower front portion of the machine and is connected with the chute 47 substantially as indicated in Figs. 1 and 2 so that corn which is deposited into chute 47 will fall by gravity into the air tube 55 and be carried through said air tube with the air current therein.

The air tube 55 after passing across the lower front portion of the machine is provided with a square turn and disposed vertically from said turn. At the turn in said air tube 55 is provided a screen 56 preferably composed of wire mesh disposed substantially as indicated in Figs. 1 and 5 in a line with the horizontal portion of the air tube 55 so that the corn coming from said horizontal portion will contact the screen 56 and the smaller or imperfectly popped grains of said corn will pass through the screen 56 and fall downwardly into the pocket 57 formed at said turn in the pipe 55. The lower portion of screen 56 is formed of smaller mesh than the portion above a point, as at 58. The air forcing the corn against the lower portion of screen 56 permits the use of a finer screen than the portion above point 58, since the heavier grains fall back by gravity and require a coarser mesh of screen to permit their passage therethrough.

Situated under screen 56 is an inclined plate 59 adapted to deflect the air passing through screen 56 upwardly toward the vertical portion of said pipe 55. An opening is provided at the lower end of plate 59 to permit the grains of corn which have passed through the screen 56 to fall into the pocket 57 from which they are manually removed through a sliding door 60. A glazed aperture 61 is provided to permit exposure of the corn at screen 56, as clearly indicated in Fig. 5. Only the perfectly popped corn will be carried upwardly through the vertical portion of pipe 55 as the imperfectly and partially popped grains will be too heavy and not present enough resisting surface to the current of air to be carried upwardly through the vertical portion of said pipe. The corn which passes through the vertical portion of pipe 55 will be carried outwardly through the opening 62 into a hopper 63 which is also provided with a glazed aperture 64, as indicated in Fig. 5 to expose the corn as it is passed through opening 62. The lower portion of hopper 63 is restricted and a guiding plate 65 is pivotally mounted as at 66 therein and adapted to direct the corn to the measuring compartments 67 and 68 of the measure 69. The measure 69 is mounted on a pivotal point 70 in a chamber 71 and provided with guides 72 which carry movable weights 73. The weights 73 are adapted to maintain the measure 69 in position to receive the corn to be measured and when the corn is passed into one or the other of compartments 67 or 68 until said compartment is filled, the weight of said corn will automatically move the measure 69 on its pivotal point until the weights 73 shift on their guide 72 to present the other measuring compartment to be filled. The measure 69 is provided with a pin 74 which coöperates with the bifurcated end of a lever 75 which is pivoted to the side of hopper 63 to effect shifting of the plate 65 which is also connected to the bifurcated end of lever 75 by a pin 76, as clearly illustrated in Fig. 1. Plates 77 are secured in position at the outer sides of the measure 69 in positions to permit one or the other of compartments 67 or 68 to be emptied, as clearly indicated in Figs. 1 and 5. The housing 71 is provided with an opening 78 at its lower end to direct the corn into a bag 79, or any other desired object into which the corn is to be placed after being measured. The housing 71 is provided with a glazed aperture 80 to expose the measuring mechanism to view.

On the top of housing 8 is a tubular shell 81 adapted to support and conduct heat to a flavoring material container 82. The container 82 is designed to contain butter or other flavoring material and is provided with a valve 83 adapted to regulate the flow of material therefrom. A pipe 84 leads from valve 83 into hopper 63 and is provided at its end with a distributing nozzle 85. Said nozzle 85 is provided with a plurality of small perforations 86 around its lower edge to separate and feed the flavoring material into the corn as it passes from opening 62 downwardly to the measuring mechanism. A second tubular casing 87 is provided in the housing 8 and adapted to melt the butter or other flavoring material used.

In the hopper 9 is mounted a vertically sliding gate 88 which is provided with a slit 89 permitting the gate 88 to slide over the shaft 15. A lever 90 is mounted in the hopper 9 in the manner indicated in Fig. 2 and connected with the gate 88 to vary the amount of corn fed into warming chamber 12. On the front of the hopper 9 is provided an adjustable catch 91 adapted to maintain the lever 90 at different heights in order to lock the gate 88 in its different positions.

In operation, the corn is placed in the hopper 9 and gate 88 is set in the desired position to feed the required amount of corn to warming chamber 12. The motor 52 through its connecting gearing causes rotation of the warming chamber 12 and popping chamber 20. The inclined plates 17 in the chamber cause the corn to pass longitudinally through chamber 12 and fall through chute 18 into spout 19 which conveys the corn into chamber 35 and the plates 37 cause the corn to pass longitudinally through chamber 35 and through perforation 38 into the next outer chamber 34. In a like manner the corn is passed in alternate directions through the remaining chambers 34, 33, 32 and 31 and through perforations 39 where the heat of the burners 46 causes the corn to pop. The corn which does not pop passes through perforations 41 into chute 42 and thence out of the machine. The spiral plate 45 picks up the corn and the unpopped corn being smaller than the perforations 45' in said plate passes through the plate and back onto the wall 21 of the popping chamber 20 to be acted on further by heat from said burners 46. The popped corn passes over sheet 45 and into chute 47 and from thence is taken up by the current of air passing through tube 55 and carried against screen 56 where the partially popped and imperfectly popped grains are separated, the latter being deposited in pocket 57 and the perfectly popped grains carried through the vertical portion of pipe 55 into hopper 63 from whence it falls directly into suitable measuring mechanism. As it falls downwardly in hopper 63 the flavoring material is deposited on it from nozzle 85 insuring evenly applying the flavoring mixture.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a corn popping machine, the combination of a popping chamber; a plurality of partitions in said popping chamber dividing the latter into compartments, said partitions being provided with registering perforations in their central portions and registering slits leading from said perforations to the peripheries of said partitions; and a sheet of curved material having offset portions therein removably held in said perforations and slits, substantially as described.

2. In a corn popping machine, the combination of a popping chamber; a plurality of partitions in said popping chamber dividing the latter into compartments, said partitions being provided with registering perforations in their central portions and registering slits leading from said perforations to the peripheries of said partitions; and a spirally curved sheet in said perforations and said slits, the portion of said sheet in said slits having offsets therein and the portion thereof in said perforations being also curved conically, substantially as described.

3. In a corn popping machine, the combination of a popping chamber; a plurality of partitions in said popping chamber dividing the latter into compartments, said partitions being provided with registering perforations in their central portions and registering slits leading from said perforations to the peripheries of said partitions; and a curved sheet in said slits and perforations, the portion of said sheet in said slits being offset and having perforations therein except in the offset parts thereof, substantially as described.

4. In a corn popping machine, the combination of a rotary popping chamber; and a spirally curved sheet in said chamber with its outer edge engaging the inner side of the latter, said sheet having spaced offset portions therein and being perforated except in said offset portions, substantially as described.

5. In a corn popping machine, the combination of a rotary popping chamber; a spirally curved sheet in said chamber with its outer edge engaging the inner side of the latter and its inner edge near the axis thereof, said sheet having spaced offset portions therein and being perforated except at said offset portions; and supporting means rigidly supporting said sheet in operative position in said chamber, substantially as described.

In testimony whereof I have signed my name to this specification in the presence of two subscribing witnesses.

NATHANIEL B. POST.

Witnesses:
   Joshua R. H. Pot s,
   Helen F. Lillis.